US007610395B2

(12) United States Patent
Kawasaki et al.

(10) Patent No.: US 7,610,395 B2
(45) Date of Patent: Oct. 27, 2009

(54) TIMING DECISION APPARATUS AND TIMING DECISION METHOD

(75) Inventors: Norihiro Kawasaki, Yokosuka (JP); Hiroyuki Kasai, Yokosuka (JP); Kenichi Yamazaki, Hino (JP)

(73) Assignee: NTT DoCoMo, Inc., Tokyo (JP)

( * ) Notice: Subject to any disclaimer, the term of this patent is extended or adjusted under 35 U.S.C. 154(b) by 729 days.

(21) Appl. No.: 11/136,567

(22) Filed: May 25, 2005

(65) Prior Publication Data

US 2005/0265690 A1 Dec. 1, 2005

(30) Foreign Application Priority Data

May 25, 2004 (JP) ............... 2004-154969

(51) Int. Cl.
*G06F 15/16* (2006.01)
(52) U.S. Cl. .............. 709/232; 709/231; 709/233; 370/229
(58) Field of Classification Search ......... 709/231–233; 370/229
See application file for complete search history.

(56) References Cited

U.S. PATENT DOCUMENTS

| 6,100,941 | A | 8/2000 | Dimitrova et al. |
| 6,400,996 | B1* | 6/2002 | Hoffberg et al. ............. 700/83 |
| 7,006,881 | B1* | 2/2006 | Hoffberg et al. ............. 700/83 |
| 7,333,983 | B2* | 2/2008 | Inaba et al. .................. 707/5 |
| 2002/0019858 | A1* | 2/2002 | Kaiser et al. ................ 709/219 |
| 2002/0087402 | A1 | 7/2002 | Zustak et al. |
| 2003/0229900 | A1* | 12/2003 | Reisman ....................... 709/228 |
| 2004/0111742 | A1* | 6/2004 | Hendricks et al. ............. 725/34 |
| 2004/0128342 | A1* | 7/2004 | Maes et al. .................. 709/200 |
| 2004/0230994 | A1* | 11/2004 | Urdang et al. ................ 725/88 |
| 2005/0019007 | A1* | 1/2005 | Kato et al. .................... 386/69 |
| 2006/0218137 | A1* | 9/2006 | Inaba et al. ................... 707/5 |
| 2006/0225088 | A1* | 10/2006 | Gutta ........................... 725/14 |

FOREIGN PATENT DOCUMENTS

| EP | 1 345 133 A1 | 9/2003 |
| JP | 2003-85382 | 3/2003 |
| WO | WO 03/038544 A2 | 5/2003 |
| WO | WO 03/101098 A1 | 12/2003 |
| WO | WO 2004/006570 A1 | 1/2004 |

OTHER PUBLICATIONS

Mauro Barbieri, et al., "The Color Browser: A Content Driven Linear Video Browsing Tool", 2001 IEEE International Conference on Multimedia and Expo, The Computer Society, XP010661915, Aug. 22-25, 2001, pp. 808-811.

* cited by examiner

*Primary Examiner*—Phuoc Nguyen
(74) *Attorney, Agent, or Firm*—Oblon, Spivak, McClelland, Maier & Neustadt, L.L.P.

(57) ABSTRACT

A timing decision apparatus includes: an adaptability decision unit configured to decide a correspondence between a feature quantity of media as encoded data capable of being replayed and an adaptability showing a degree of adaptation for providing a specific service; an adaptability storage unit configured to store the correspondence; and a timing decision unit configured to decide timing of providing the specific service in response to a value of the adaptability stored in the adaptability storage unit.

13 Claims, 11 Drawing Sheets

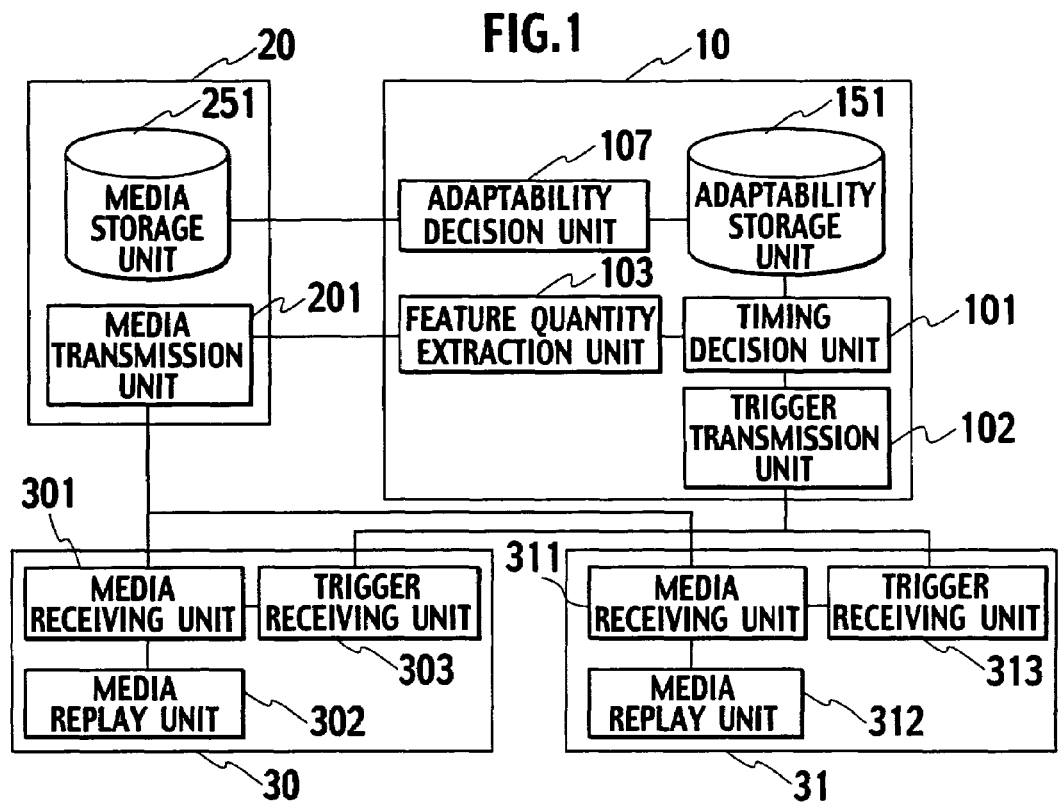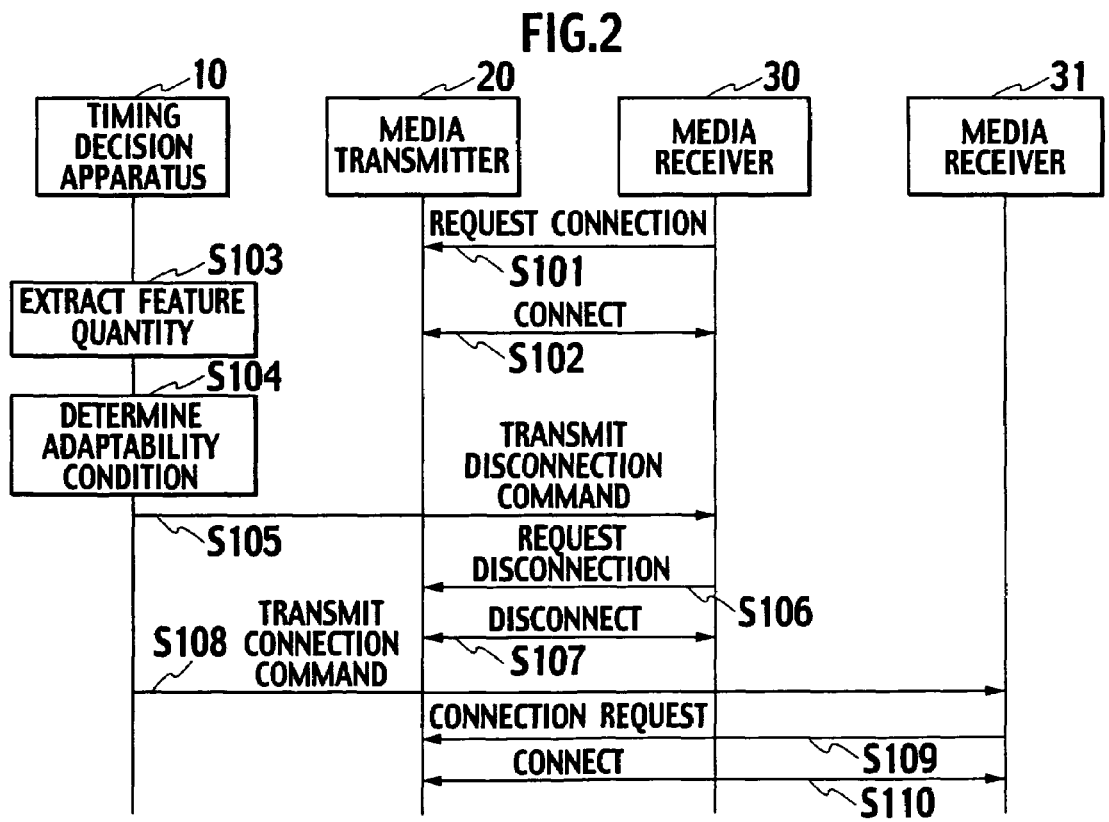

FEATURE QUANTITY OF VIDEO MEDIA
= AGGREGATE OF FEATURE QUANTITIES OF ALL BLOCKS

FEATURE QUANTITY OF BLOCK 1 AT THIS TIME
= AGGREGATE OF VERTICAL MOTION AND HORIZONTAL MOTION

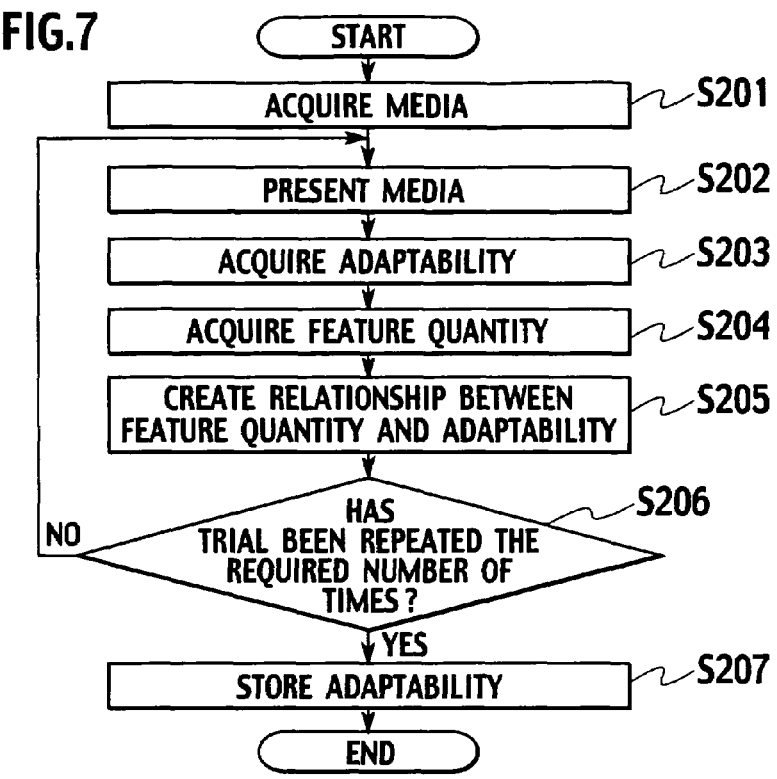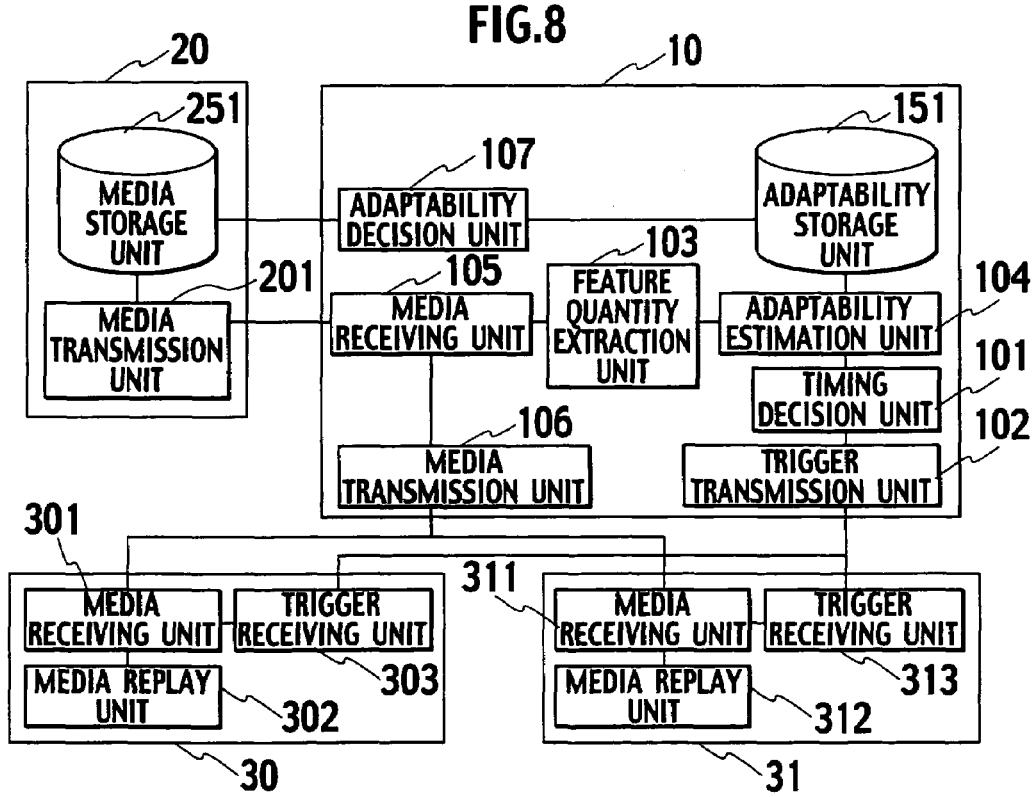

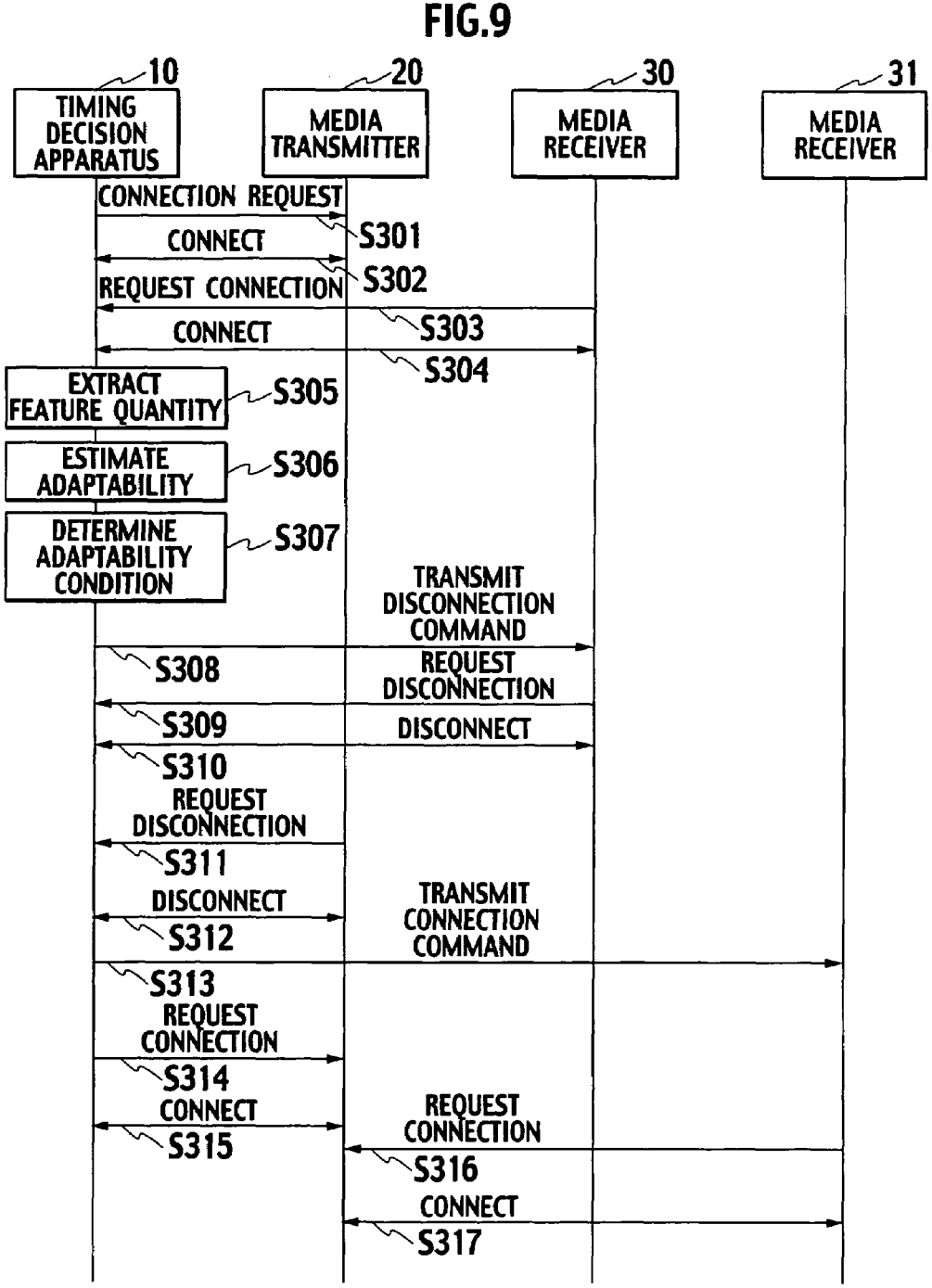

ESTIMATE FUTURE ADAPTABILITY
BY SEGMENT RATIOS

ESTIMATE FUTURE ADAPTABILITY
BY LEAST SQUARE METHOD

INTERPOLATE VALUES BY POLYNOMIAL

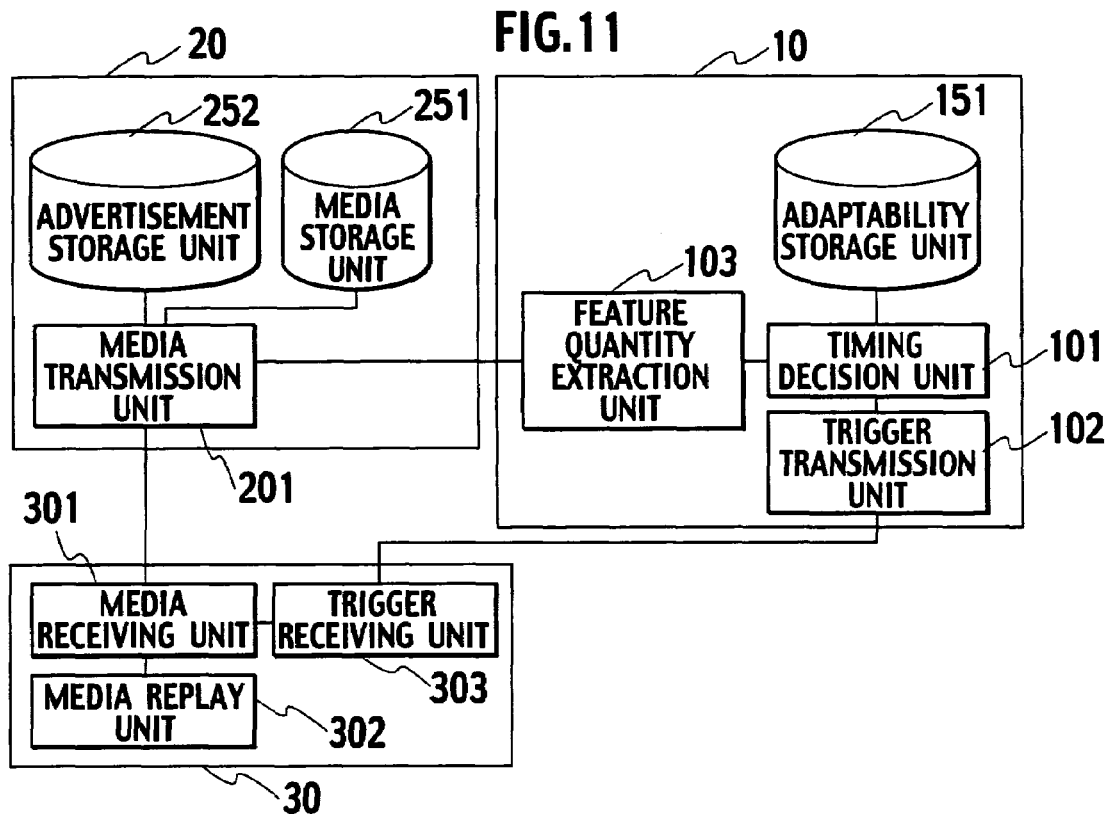
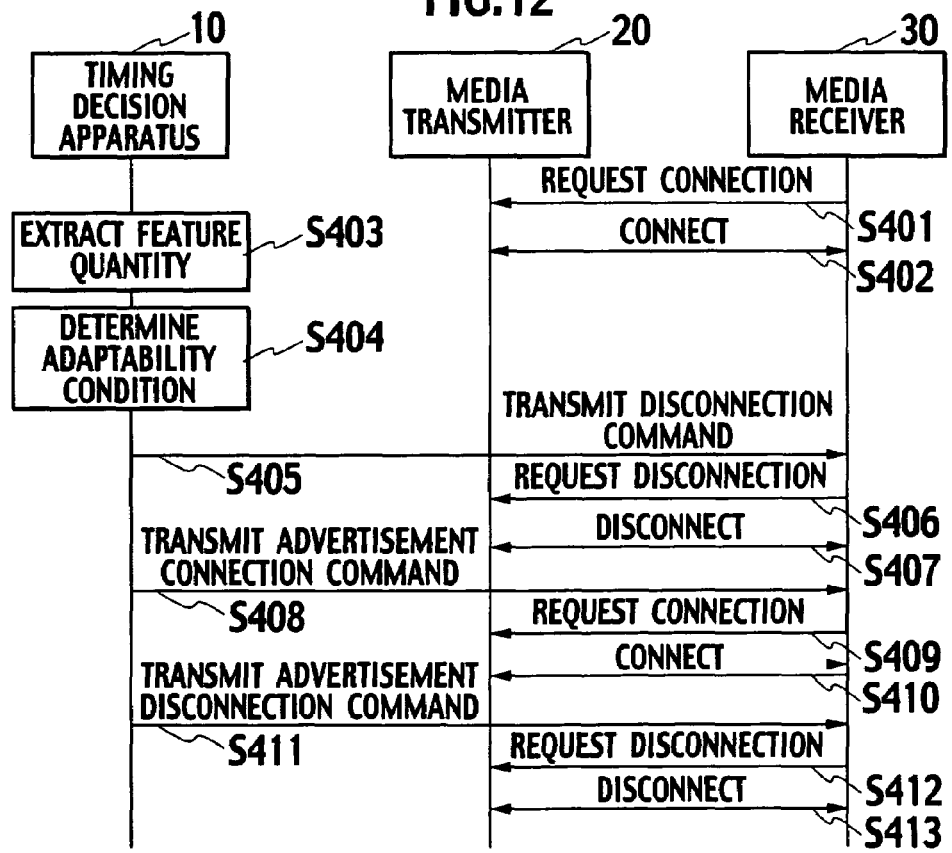

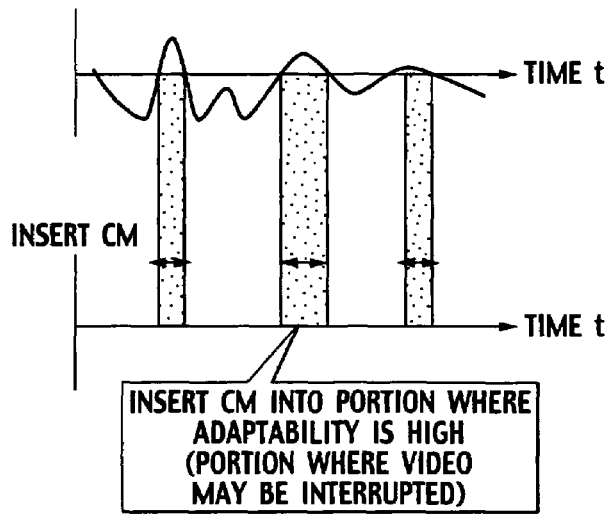
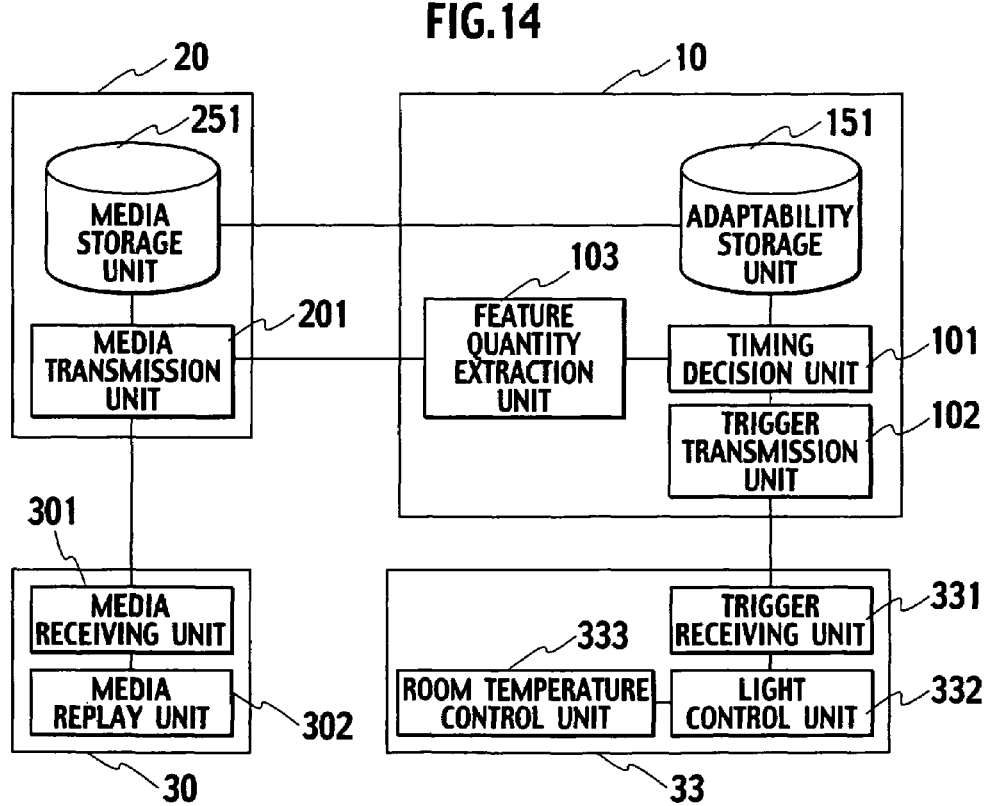

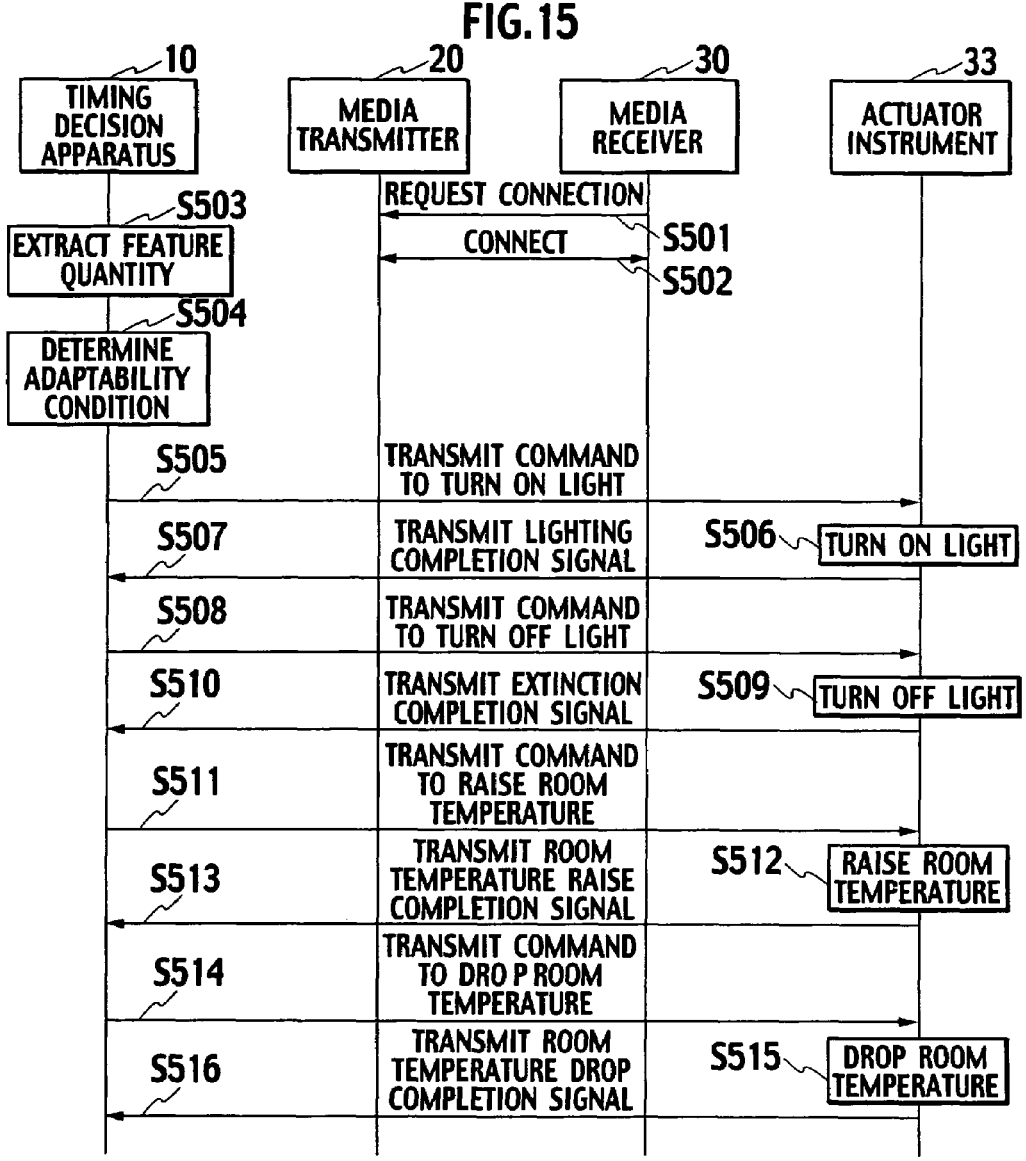

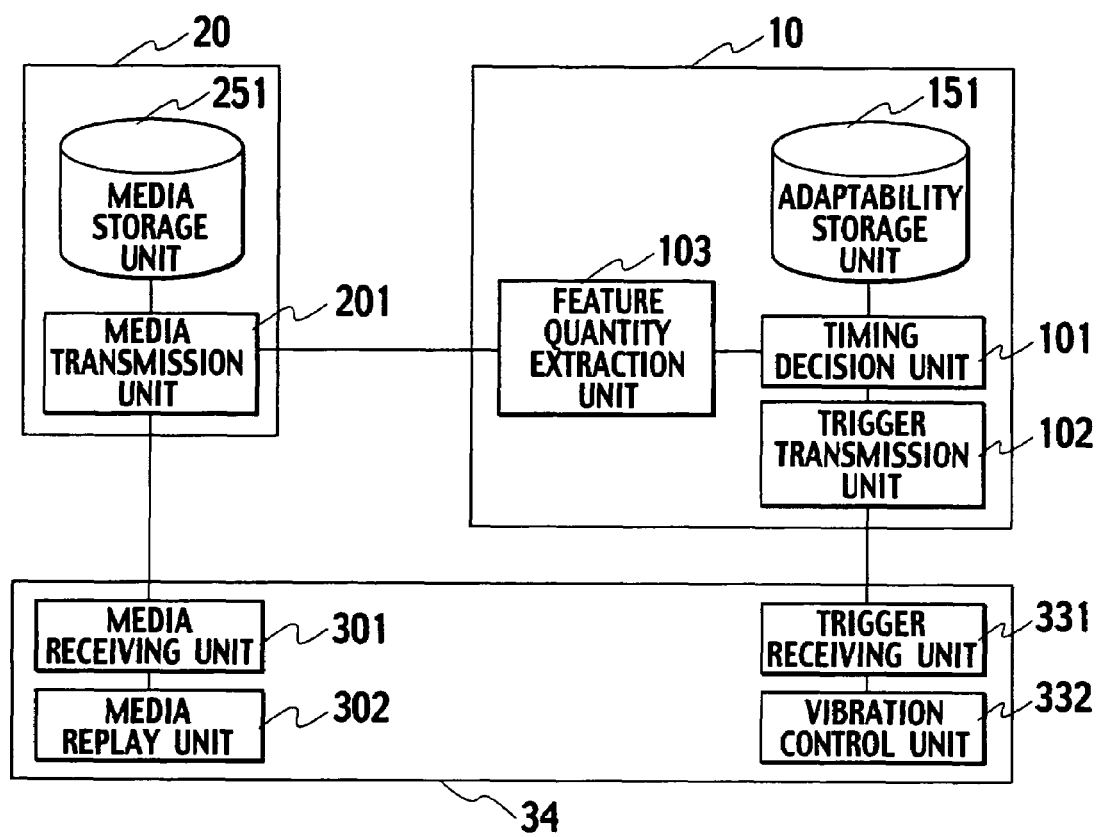

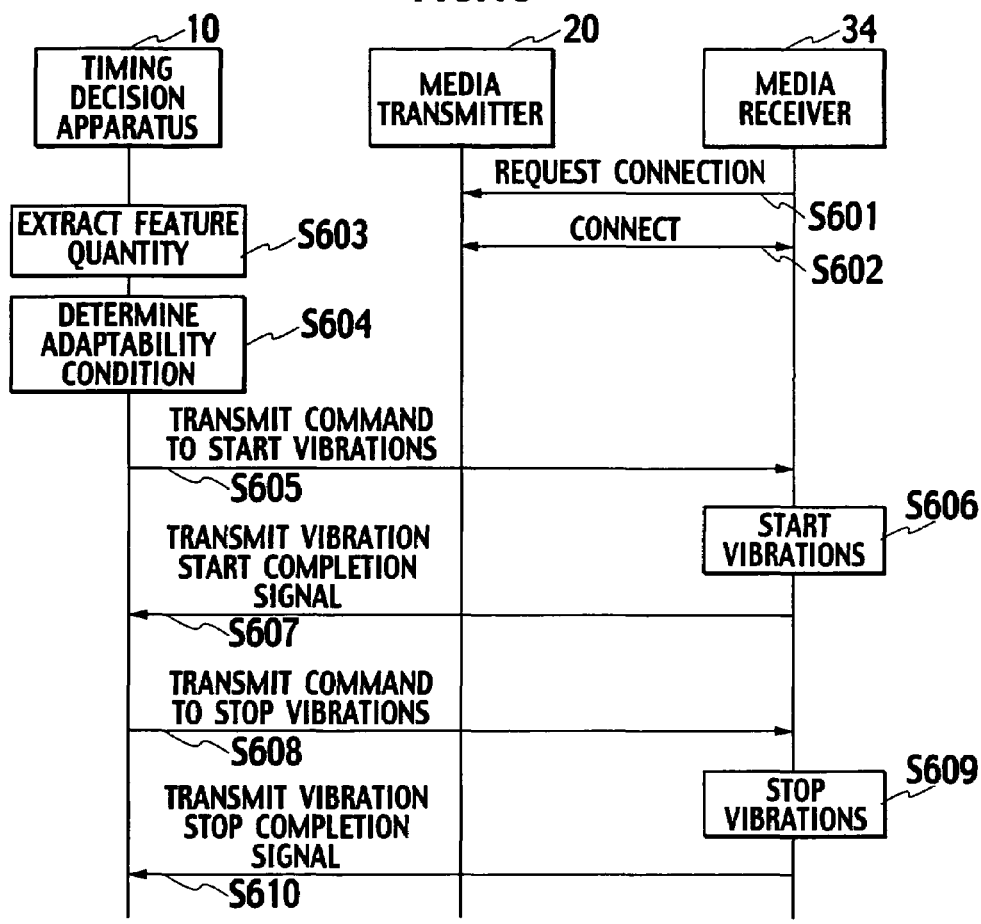

TIMING DECISION APPARATUS AND TIMING DECISION METHOD

BACKGROUND OF THE INVENTION

1. Field of the Invention

The present invention relates to a timing decision apparatus and a timing decision method for deciding timing of providing a service.

2. Description of the Related Art

In the case of providing a specific service to a user, it is necessary to provide the service at appropriate timing according to a taste and convenience of the user. Therefore, a technology for adjusting timing of providing a communication service based on positional information of a user, for example, when the user moves with an elapse of time, has been disclosed (for example, refer to Japanese Patent Laid-Open Publication No. 2003-85382).

As described above, there has been a technology for providing the service based on the positional information. However, when the user receives and replays contents of video and music, the user sometimes desires to enjoy an appropriate service according to the contents.

SUMMARY OF THE INVENTION

In this connection, considering the above-described subject, it is an object of the present invention to provide a timing decision apparatus and a timing decision method for appropriately deciding timing of providing the service based on the contents of media being replayed.

In order to achieve the above-described object, a first feature of the present invention is summarized to be a timing decision apparatus, including: (A) an adaptability decision unit configured to decide a correspondence between a feature quantity of media as encoded data capable of being replayed and an adaptability showing a degree of adaptation for providing a specific service; (B) an adaptability storage unit configured to store the correspondence; and (C) a timing decision unit configured to decide timing of providing the specific service in response to a value of the adaptability stored in the adaptability storage unit.

According to the timing decision apparatus in accordance with the first feature, the feature quantity of the media and the adaptability are compared with each other, thus making it possible to appropriately decide the timing of providing the service based on the contents of the media being replayed.

Moreover, the timing decision apparatus according to the first feature may further include an adaptability estimation unit configured to estimate a future adaptability based on a past adaptability stored in the adaptability storage unit and the feature quantity of the media. According to this timing decision apparatus, the timing of providing the service can be appropriately decided even for media for which the adaptability has been unable to be calculated in advance.

Moreover, the adaptability decision unit in the timing decision apparatus according to the first feature may include: a feature quantity extraction unit configured to extract the feature quantity of the media; a media replay unit configured to replay the media; an adaptability acquisition unit configured to acquire an assessment result at the timing of providing the specific service to the media; and a correspondence creation unit configured to associate the feature quantity of the media replayed from the media replay unit and the assessment result acquired from the adaptability acquisition unit with each other. According to this timing decision apparatus, the feature quantity of the media and the adaptability can be precisely associated with each other.

A second feature of the present invention is summarized to be a timing decision method, including: (A) deciding a correspondence between a feature quantity of media as encoded data capable of being replayed and an adaptability showing a degree of adaptation for providing a specific service; (B) storing the correspondence; and (C) deciding timing of providing the specific service in response to a value of the stored adaptability.

According to the timing decision method in accordance with the second feature, the feature quantity of the media and the adaptability are compared with each other, thus making it possible to appropriately decide the timing of providing the service based on the contents of the media being replayed.

According to the present invention, the timing decision apparatus and the timing decision method for appropriately deciding the timing of providing the service based on the contents of the media being replayed can be provided.

BRIEF DESCRIPTION OF THE DRAWINGS

FIG. 1 is a configuration block diagram of a timing decision apparatus according to a first embodiment.

FIG. 2 is a flowchart showing a timing decision method according to the first embodiment.

FIG. 7 is a flowchart showing a subjective assessment method (adaptability decision method) according to the first to fifth embodiments.

FIG. 8 is a configuration block diagram of a timing decision apparatus according to the second embodiment.

FIG. 9 is a flowchart showing a timing decision method according to the second embodiment.

FIG. 11 is a configuration block diagram of a timing decision apparatus according to the third embodiment.

FIG. 12 is a flowchart showing a timing decision method according to the third embodiment.

FIG. 13 is a view explaining timing of inserting an advertisement according to the third embodiment.

FIG. 14 is a configuration block diagram of a timing decision apparatus according to the fourth embodiment.

FIG. 15 is a flowchart showing a timing decision method according to the fourth embodiment.

FIG. 16 is an example of a table of adaptive patterns stored in an adaptability storage unit according to the fourth embodiment.

FIG. 17 is a configuration block diagram of a timing decision apparatus according to the fifth embodiment.

FIG. 18 is a flowchart showing a timing decision method according to the fifth embodiment.

FIG. 19 is an example of a table of adaptive patterns stored in the adaptability storage unit according to the fifth embodiment.

DETAILED DESCRIPTION OF THE EMBODIMENTS

Figure 3:
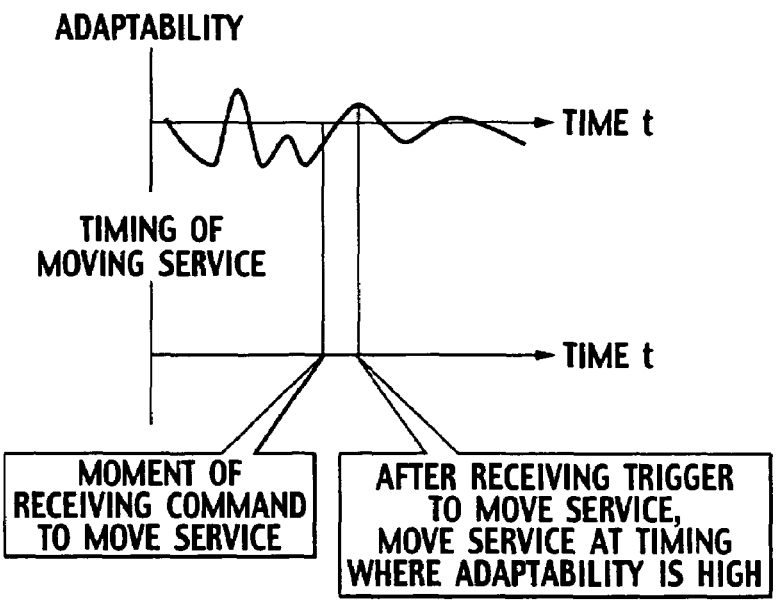
FIG. 3 is a view explaining timing of moving a service according to the first embodiment.

Next, embodiments of the present invention will be described with reference to the drawings. In the description below with reference to the drawings, the same or similar numerals are assigned to the same or similar portions. It should be noted that the drawings are schematic.

First Embodiment

In a first embodiment, in a service of moving media being replayed on a communication terminal (media receiver) to another communication terminal (media receiver), timing of moving the service is decided. In the first embodiment, description will be made of the case where a feature quantity for the media being replayed is already stored in a timing decision apparatus (static timing decision method).

As shown in FIG. 1, a timing decision system according to the first embodiment includes a timing decision apparatus 10, a media transmitter 20, and media receivers 30 and 31. Here, it is aimed to perform a service of moving media being replayed on the media receiver 30 at present to the media receiver 31 at appropriate timing. Moreover, for example, cellular phones, PHSs and the like are used as the media receivers 30 and 31; however, the media receivers 30 and 31 just have to be instruments, each having functions to replay and receive the media, which will be described later in detail.

The media transmitter 20 includes a media storage unit 251 for storing the media, and a media transmission unit 201 for transmitting the media to the timing decision apparatus 10 and the media receivers 30 and 31. Here, the "media" refers to encoded data capable of being replayed, such as video data and audio data.

The media receivers 30 and 31 include media receiving units 301 and 311 for receiving the media from the media transmitter 20, media replay units 302 and 312 for replaying the media, and trigger receiving units 303 and 313 for receiving triggers (commands) for connection/disconnection with the media transmitter 20 from the timing decision apparatus 10, respectively. Here, the "connection" refers to a logical communication path linked between the apparatuses. For example, the connection is identified by a transmission source IP address and a transmission source port number, and a transmission destination IP address and a transmission destination port number.

As shown in FIG. 1, the timing decision apparatus 10 includes a feature quantity extraction unit 103, an adaptability decision unit 107, an adaptability storage unit 151, a timing decision unit 101, and a trigger transmission unit 102.

The feature quantity extraction unit 103 extracts a feature quantity of the media that has been received from the media transmitter 20 and is being replayed on the media receiver 30 at present. The feature quantity is classified into a low-level feature quantity calculated from a measurement value of the media and a high-level feature quantity capturing a semantic aspect of the media. For example, when the media is video data, the low-level feature quantity includes a color, texture, shape, motion (for example, motion vector), region, and the like of an overall frame or a subject. When the media is music data, the low-level feature quantity includes a size, pitch, spectrum analysis signal and the like of a sound. The spectrum analysis signal is, for example, one obtained by performing the inverse Fourier transformation for a logarithm of a short-time amplitude spectrum. Meanwhile, for example, a semantic aspect of MPEG-7 is usable as the high-level feature quantity (refer to "Part5-Multimedia Description Scheme", ISO/IEC 15938-5). The semantic aspect is one that relates to related information of the media, can describe a relationship between characters and objects appearing on a video, and enables an abstract retrieval in a semantic level even for the one for which it is difficult to perform a retrieval by using the low-level feature quantity. For example, an abstract retrieval for "a video of a happy-looking couple holding a wedding ceremony in a beautiful church" is made possible. The feature quantity will be described later in detail.

The adaptability decision unit 107 decides a correspondence between a feature quantity of the media stored in the media storage unit 251 and an adaptability, and stores the correspondence in the adaptability storage unit 151. Here, the "adaptability" refers to a degree of adaptation for providing a specific service. Moreover, the specific service includes a movement of a service between terminals, an advertisement insertion service, an actuator interlocking service, and the like. A method for deciding a concrete adaptability will be described later in detail. Note that, in the first embodiment, it is assumed that processing for deciding the adaptability has been performed in advance before the media is transmitted to the media receiver 30.

The adaptability storage unit 151 stores such a correspondence relationship between the adaptability and the feature quantity of the media while associating both with each other.

The timing decision unit 101 compares, with each other, a value of the adaptability stored in the adaptability storage unit 151, and the feature quantity of the media being displayed at present on the media receiver 30, the feature quantity having been extracted by the feature quantity extraction unit 103, thereby deciding timing of providing the specific service. Specifically, the timing decision unit 101 may decide the timing by determining whether or not the adaptability stored in the adaptability storage unit 151 exceeds a certain value (threshold value). For example, when the adaptability is represented by numeric values from 0 to 1, the timing decision unit 101 determines that a value exceeding 0.8 indicates timing suitable for providing the service, and determines that a value of 0.8 or less indicates timing unsuitable for providing the service.

Moreover, the timing decision unit 101 transmits the triggers to the trigger receiving units 303 and 313 of the media receivers 30 and 31 through the trigger transmission unit 102 at the timing determined to be suitable. Here, it is necessary to determine the timing of providing the service in consideration of a time when the triggers were transmitted before. For example, if the triggers are transmitted every time when the adaptability rises and falls in the vicinity of the threshold value, the service will skip between the media receivers 30 and 31 (chattering). In order to prevent the chattering, it is necessary not to determine that the timing is suitable for providing the service for a certain period of time even if the adaptability exceeds the threshold value, or not to determine that the timing is unsuitable for providing the service for the certain period of time even after the adaptability falls below the threshold value. Although the certain period of time differs depending on the service to be handled, approximately two to five seconds are recommended with regard to the movement of the service.

To the trigger receiving unit 303 of the media receiver 30, the trigger transmission unit 102 transmits a command to disconnect the connection thereof with the media transmitter 20 according to the determination of the timing decision unit 101, and to the trigger receiving unit 313 of the media receiver 31, transmits a command to make the connection thereof to the media transmitter 20 according thereto. For protocol between the trigger transmission unit 102 and the trigger receiving units 303 and 313, the Internet Layer 7 (for example, HTTP, SIP and FTP) is usable. For example, it is recommended to transmit the "connection command" and the "disconnection command", which are transmitted from the timing decision apparatus 10 to the media receivers 30 and 31, while containing these commands in a payload.

Moreover, the timing decision apparatus according to the first embodiment includes a central processing unit (CPU), and can be configured to include, as modules, the adaptability decision unit 107, the feature quantity extraction unit 103, the timing decision unit 101, and the like. These modules can be realized by executing a dedicated program for using a predetermined program language in a general-purpose computer such as a personal computer.

Moreover, the adaptability storage unit 151 is a storage medium for storing the correspondence between the feature quantity and the adaptability. For example, the storage medium includes a RAM, a ROM, a hard disk, a flexible disk, a compact disc, an IC chip, a cassette tape, and the like. According to the storage media as described above, the storage, carriage, sale and the like of adaptability data can be performed easily.

Moreover, though not shown, the timing decision apparatus 10 may include a program storage unit for storing a program for causing the central processing unit (CPU) to execute the adaptability decision processing, feature quantity extraction processing, timing decision processing, and the like. For example, the program storage unit is a storage medium such as the RAM, the ROM, the hard disk, the flexible disk, the compact disc, the IC chip, and the cassette tape. According to the storage media as described above, the storage, carriage, sale and the like of a recognition program can be performed easily.

Next, a timing decision method according to the first embodiment will be described by using FIG. 2.

(A) First, in Step S101, the media receiver 30 transmits a connection request to the media transmitter 20. Then, in Step S102, the connection is established between the media transmitter 20 and the media receiver 30. Here, the connection refers to a logical communication path identified by an IP address and a port number in the media transmitter 20 and an IP address and a port number in the media receiver 30. After the connection is established, the media is transmitted from the media transmitter 20 to the media receiver 30, and the media is replayed on the media receiver 30.

(B) Next, in Step S103, the feature quantity extraction unit 103 of the timing decision apparatus 10 extracts the feature quantity of the media transmitted from the media transmitter 20 to the media receiver 30. Then, in Step S104, the timing decision unit 101 of the timing decision apparatus 10 acquires the adaptability for providing the service by using the correspondence between the feature quantity and the adaptability, which is stored in the adaptability storage unit 151, and decides the timing of moving the service. For example, the timing decision unit 101 determines whether or not the adaptability exceeds a certain value.

(C) When the adaptability meets the condition, the timing decision apparatus 10 transmits a command to disconnect the connection to the media receiver 30 through the trigger transmission unit 102 in Step S105. Upon receiving the disconnection command from the timing decision apparatus 10, the media receiver 30 transmits a disconnection request to the media transmitter 20 in Step S106. Thereafter, in Step S107, the connection between the media transmitter 20 and the media receiver 30 is disconnected.

(D) Next, in Step S108, the timing decision apparatus 10 transmits the connection command to the media receiver 31 through the trigger transmission unit 102. Upon receiving the connection command from the timing decision apparatus 10, the media receiver 31 transmits a connection request to the media transmitter 20 in Step S109. Thereafter, in Step S110, the connection is established between the media transmitter 20 and the media receiver 31. After the connection is established, the media is transmitted from the media transmitter 20 to the media receiver 31, and the media is replayed on the media receiver 31.

As described above, according to the timing decision apparatus 10 and the timing decision method according to the first embodiment, as shown in FIG. 3, when the media being replayed is moved to another terminal device, the service can be moved at the timing where the adaptability is high.

Next, the feature quantity described above will be described more in detail.

First, description will be made of the case of using a motion vector as the feature quantity of the video data. A method for obtaining the motion vector includes a block matching method and a gradient method (refer to: IMAMURA Hiroki; KENMOCHI Yukiko; KOTANI Kazunori, "Estimation of Optical Flow in a Three-Dimensional Voting Space for Brightness", Journal of The Institute of Electronics, Information and Communication Engineers, Vol. J85-D-II, No. 1, pp. 12-12, 2002). In the block matching method, an amount to be processed is large though the motion can be detected precisely, and in the gradient method, precision thereof for detecting the motion is low though an amount to be processed is relatively small. However, in the case of using a codec that has already calculated the motion vector (for example, for MPEG), processing for acquiring the feature quantity from the inside of the media is performed.

Figure 4A:
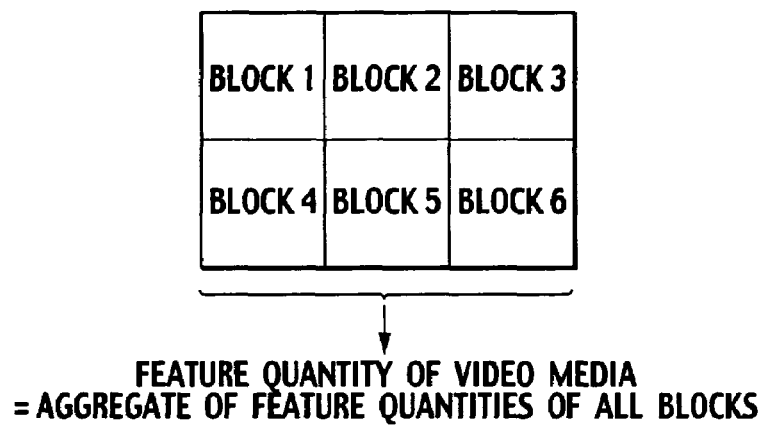
FIGS. 4A and 4B are views explaining a feature quantity of video data according to the first to fifth embodiments.
Figure 4B:
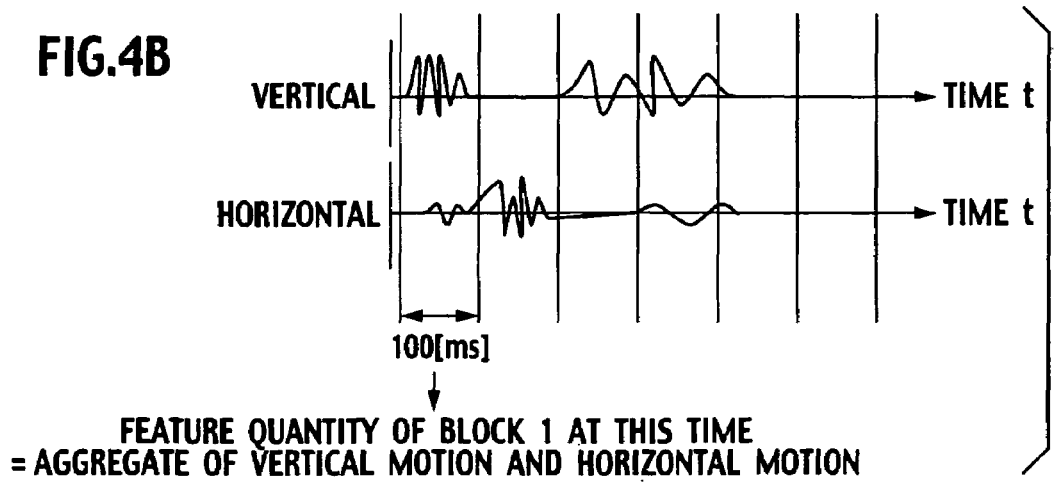

In the case of using the block matching method, the total sum of absolute values of the motion vectors in the respective blocks can be treated as the feature quantity of the video. Specifically, as shown in FIG. 4A, a video (frame) is divided into plural blocks. Then, to which direction the respective blocks in a certain frame have been moved in the next frame is calculated. Specifically, as shown in FIG. 4B, quantities of vertical and horizontal motions at a certain time interval (for example, 100 ms) are calculated. In this case, it is assumed that the feature quantity is an aggregate of the feature quantities regarding all the blocks.

Figure 5:
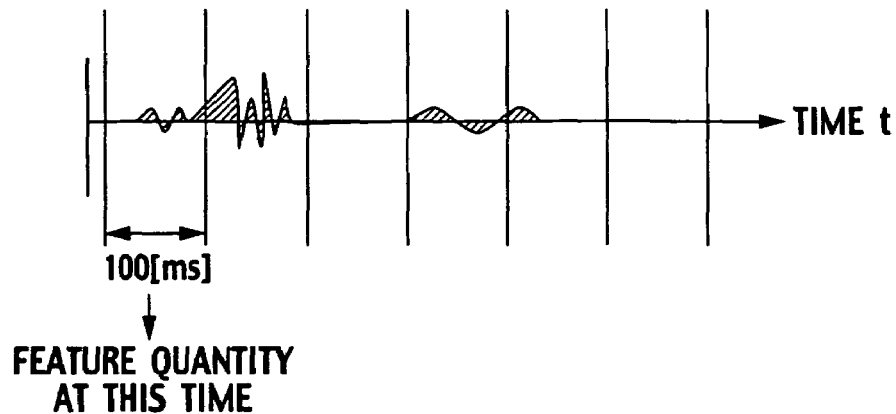
FIG. 5 is a view explaining a feature quantity of audio data according to the first to fifth embodiment.

Moreover, description will be made of the case of using a pulse train as the feature quantity of the audio data. In order to calculate a feature quantity of the pulse string, as shown in FIG. 5, a certain time interval (for example, 100 ms) is cut out as a frame. Then, the feature quantity is calculated from a magnitude of amplitude and the number of waves in the frame.

The above-described calculations of the feature quantities by using the motion vector and the pulse train are mere examples, and it is a matter of course that the feature quantity may be calculated by using other data.

Next, the method for deciding the adaptability, which has been described in association with the adaptability decision unit 107, will be described more in detail. For example, the adaptability decision method includes a method using an approximation of function, and a method using a subjective assessment.

First, the method using the approximation of function will be described. With regard to the adaptability in the case of providing the service, the case is assumed, where the adaptability is higher as the motion vector of the video is larger and a volume of the sound is larger, for example, in the case of moving the service. Here, an adaptability $F(t)$ at a certain time t is represented as:

$$F(t)=C_{mv}(t)+C_{sv}(t) \quad \text{Equation (1)}$$

where $C_{mv}$ is a feature quantity of a motion vector mv (moving vector) of the video at the time t, and $C_{sv}$ is a feature quantity of the sound volume sv (sound vector) at the time t. Here, a feature quantity Cx regarding a certain characteristic X can be normalized within a range from 0 as the minimum to 1 as the maximum. Moreover, the time corresponds to each frame of the video and each sample of the audio. Moreover, when the adaptability is lower as the sound volume is larger, an inverse number of the sound vector may be used as below.

$$F(t)=C_{mv}(t)+1/C_{sv}(t) \quad \text{Equation (2)}$$

Moreover, only information regarding the certain time t gets involved in a relationship between the above-described adaptability F(t) and a feature quantity Cx(t) regarding the characteristic X. However, it is also conceivable to establish a formulation by using a past feature quantity (for example, a feature quantity $C_x(t-1)$ one time before) and a past adaptability (for example, an adaptability F(t−1) one time before). For example, in the case of using the feature quantity $C_x(t-1)$ one time before, the following equation is established.

$$F(t) = \sum_{x=*} \{C_x(t) + C_x(t-1)\} \quad \text{Equation (3)}$$

where * is all the feature quantities.

Equation (3) is a mere example. In the case of calculating the current adaptability F(t) independently of the past adaptability F(t−1), an equation that does not use F(t−1) may be used. In the case of calculating the current adaptability F(t) independently of the past feature quantity $C_x(t-1)$, an equation that does not use $C_x(t-1)$ may be used. Moreover, results from plural defining equations may also be combined. For example, an arithmetic mean may be used as below.

$$F(t)=\{F_1(t)+F_2(t)\}/2)\} \quad \text{Equation (4)}$$

Here, for example, $F_1(t)$ can be calculated by using Equation (3).

Moreover, when the media used in the case of obtaining the relationship between the feature quantity and the adaptability and the media used for deciding the timing are equal to each other, it is also possible to establish a formulation by using a future feature quantity (for example, a feature quantity $C_x(t+1)$ one time after) and a future adaptability (for example, an adaptability F(t+1) one time after). For example, in the case of using the feature quantity $C_x(t+1)$ one time after, the following equation is established.

$$F(t) = \sum_{x=*} \{C_x(t+1) + C_x(t-1)\} \quad \text{Equation (5)}$$

Figure 6:
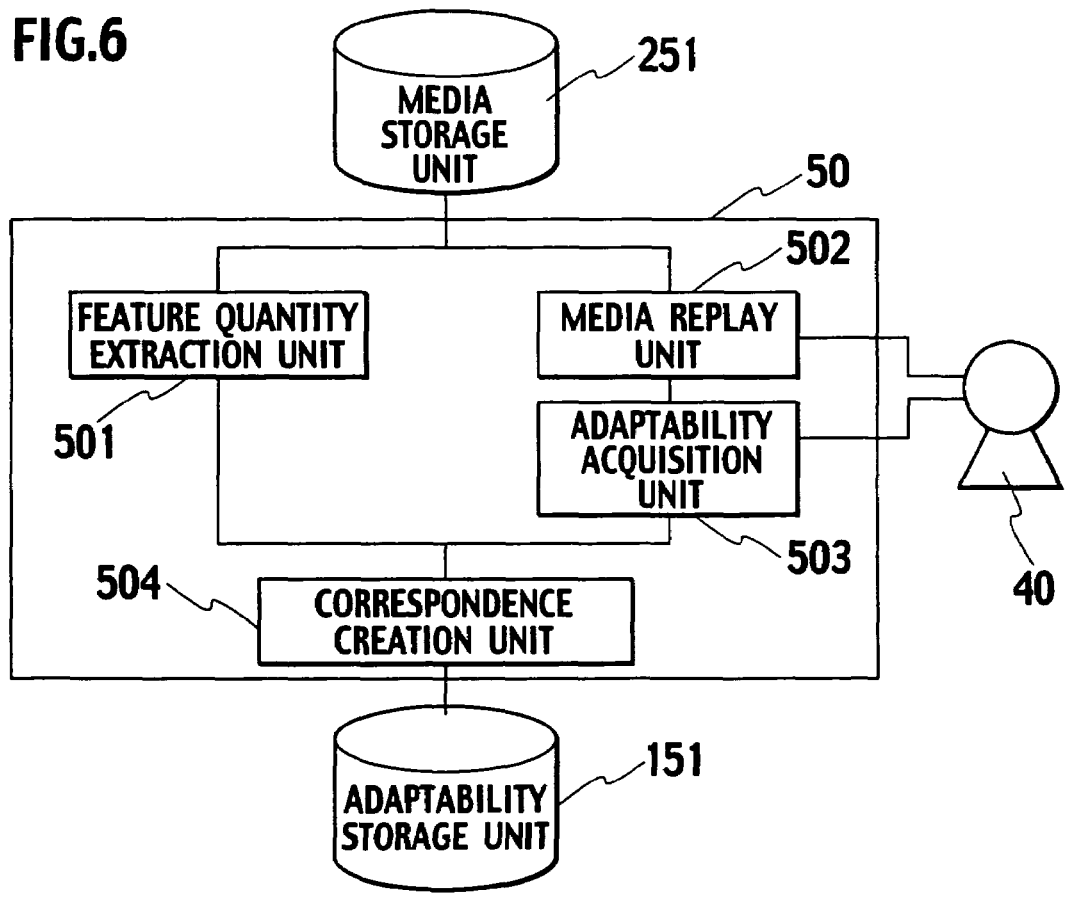
FIG. 6 is a configuration block diagram of a subjective assessment apparatus (adaptability decision unit) according to the first to fifth embodiments.

Next, a method using the subjective assessment will be described as the method for determining the adaptability. As shown in FIG. 6, a subjective assessment apparatus 50 (adaptability decision unit 107) for use in the subjective assessment includes a feature quantity extraction unit 501, a media replay unit 502, an adaptability acquisition unit 503, and a correspondence creation unit 504. The feature quantity extraction unit 501 extracts the feature quantity of the media acquired from the media storage unit 251. The media replay unit 502 replays and presents the media to a user 40. The adaptability acquisition unit 503 acquires an assessment result of the user 40 for the timing of providing the specific service to the replayed media. For example, in the case of performing the service of moving the media being replayed on a communication terminal to another communication terminal, the user 40 assesses timing suitable for moving the service midway while reproducing the media. In this case, for example, the user 40 assesses the designated time in five steps, and inputs numbers from 1 to 5 as assessment values to the adaptability acquisition unit 503. The correspondence creation unit 504 associates the feature quantity of the media replayed on the media replay unit 502 and the assessment value of the user, which is acquired from the adaptability acquisition unit 503, with each other, and stores the associated feature quantity and assessment value in the adaptability storage unit 151.

Here, the assessment method by the user includes a single stimulus method and a double stimulus method as methods standardized by the ITU-R Recommendation (refer to ITU-R Recommendation BT. 500-7, "Methodology for the subjective assessment of the quality of television pictures," pp. 582-604, 1995). The single stimulus method is a method for giving stimuli to the respective trials (for example, pieces of timing of moving the service), thereby prompting the assessment. The double stimulus method is a method for comparing stimuli serving as references for the respective trials and stimuli to be compared therewith with each other, thereby prompting the assessment. The double stimulus method requires a long testing time though precision thereof is high, and accordingly, has a problem to burden the user with a heavy load.

Moreover, the assessment value includes a quality value and a degradation value, which are standardized by the ITU-R Recommendation (refer to ITU-R Recommendation BT. 500-7, "Methodology for the subjective assessment of the quality of television pictures," pp. 582-604, 1995). The quality value has a five-step scale (5: very good; 4: fairly good; 3: neither; 2: fairly poor; 1: very poor) representing a degree of goodness. The degradation value has a five-step scale (5: undetectable; 4: unannoying though detectable; 3: annoying a little; 2: annoying; 1: annoying much) representing a degree of degradation. These assessment values may be normalized into a value from 0 to 1 in the case of being stored in the adaptability storage unit 151.

Moreover, when it is difficult to obtain the feature quantity for every video and audio, the correspondence between the feature quantity and the adaptability may be obtained in consideration of a type of the video and a type of the audio. For example, when the video data is classified into a sports video, a news video, a drama video and the like, and the adaptability is obtained for new media, the adaptability may be obtained based on an adaptability for the same type of data.

For example, it is assumed that there is a video in which a correspondence between a certain feature quantity a and a certain adaptability b is self-evident with regard to a certain drama video. In the case of obtaining an adaptability b' for a video showing a feature quantity a' similar to the feature quantity a, the adaptability b' can be obtained from the adaptability b. For example, when it is desirable to increase the adaptability as the feature quantity is increased, the adaptability b' is set equal to b(a'/a), and when it is desirable to decrease the adaptability as the feature quantity is increased, the adaptability b' is set equal to b(a/a').

Next, the subjective assessment method (adaptability determination method) according to the first embodiment will be described by using FIG. 7. Here, description will be made by using a single-stimulus quality scale as an example.

(A) First, in Step S201, the feature quantity extraction unit 501 acquires the media from the media storage unit 251, and extracts the feature quantity therefrom. Next, in Step S202, the media replay unit 502 presents an assessment stimulus regarding the media to the user 40. The user 40 assesses how good he/she feels the assessment stimulus is by using the five-step quality value. For example, when the user is requested to asses the timing of moving the service, service movements that move the service between the terminals in 0 second at plural replay times (example: 10 seconds, 20 seconds, 30 seconds) in the media are defined as the assessment stimuli.

(B) Next, in Step S203, the adaptability acquisition unit 503 acquires a result of the assessment of the user as the adaptability. The correspondence creation unit 504 acquires the adaptability obtained by the adaptability acquisition unit 503, and the feature quantity extracted by the feature quantity extraction unit 501 (Step S204), and creates the correspondence between the feature quantity and the adaptability in Step S205.

(C) Next, in Step S206, it is determined whether or not the trial has been repeated the required number of times. When the trial has not been repeated the required number of times yet, the processing returns to Step S202. Meanwhile, when the trial has been repeated the required number of times, the processing proceeds to Step S207, where the adaptability storage unit 151 associates the feature quantity of the media and an assessment value (adaptability) from the user with each other, and stores the associated feature quantity and assessment value.

Note that, when an order of the assessment stimuli to be given is estimated by the user, a sense thereof cannot accurately make the assessment owing to an influence of preoccupation. Accordingly, it is recommended to randomly select the assessment stimuli in the respective trials, and to present the selected assessment stimuli to the user.

Moreover, though the adaptability decision unit 107 shown in FIG. 6 has been described as a device (subjective assessment apparatus 50) for use in the method using the subjective assessment, the adaptability decision unit 107 may also be used as a device for use in the method using the approximation of function. In this case, the adaptability acquisition unit 503 acquires a result of the assessment by the approximation of function for the timing of providing the specific service to the replayed media. Then, the correspondence creation unit 504 associates the feature quantity of the media replayed from the media replay unit 502 and an assessment value by the approximation of function, which is replayed from the media replay unit 502, with each other, and stores the associated feature quantity and assessment value in the adaptability storage unit 151.

According to the timing decision apparatus 10 and the timing decision method according to the first embodiment, the feature quantity and adaptability of the media are compared with each other, thus making it possible to appropriately decide the timing of providing the service based on the contents of the media being replayed. Specifically, the media being replayed on the communication terminal can be moved to another communication terminal device at appropriate timing.

Moreover, by using the method using the approximation of function and the method using the subjective assessment, the adaptability decision unit 107 can precisely associate the feature quantity of the media replayed from the media replay unit 502 and the assessment result form the adaptability acquisition unit 503 with each other.

Second Embodiment

In the first embodiment, the feature quantity for the media being replayed has been already stored (static timing decision method). In a second embodiment, description will be made of the case where the feature quantity is not stored and it is necessary to estimate the feature quantity simultaneously with the replay of the media (dynamic timing decision method). Note that, also in the second embodiment, as in the first embodiment, timing of moving the service is decided in the service of moving the media being replayed on a communication terminal (media receiver) to another communication terminal (media receiver).

As shown in FIG. 8, a timing decision system according to the second embodiment includes the timing decision apparatus 10, the media transmitter 20, and the media receivers 30 and 31. Here, it is aimed to perform a service of moving media being replayed on the media receiver 30 to the media receiver 31 at appropriate timing. Moreover, for example, cellular phones, PHSs and the like are used as the media receivers 30 and 31; however, the media receivers 30 and 31 just have to be instruments, each having functions to replay and receive the media, which will be described later in detail.

The media transmitter 20 is similar to that of the first embodiment except that the media transmission unit 201 transmits the media only to the timing decision apparatus 10, and accordingly, description thereof will be omitted here.

The media receivers 30 and 31 are similar to those of the first embodiment except that the media receiving units 301 and 311 receive the media from the timing decision apparatus 10, and that the trigger receiving units 303 and 313 receive the triggers (commands) for the connection/disconnection with the timing decision apparatus 10 from the timing decision apparatus 10 concerned, and accordingly, description thereof will be omitted here.

As shown in FIG. 8, the timing decision apparatus 10 includes the feature quantity extraction unit 103, the adaptability decision unit 107, the adaptability storage unit 151, the timing decision unit 101, the trigger transmission unit 102, a media receiving unit 105, a media transmission unit 106, and an adaptability estimation unit 104.

The media receiving unit 105 receives the media from the media transmitter 20. The media transmission unit 106 transmits the media to the media receivers 30 and 31.

The adaptability estimation unit 104 estimates a future adaptability based on the past adaptability and the feature quantity stored in the adaptability storage unit 151. For example, the adaptability estimation unit 104 can assume that a current adaptability exists on a straight line of an adaptability one time before and an adaptability two times before, and can estimate the future adaptability by segment ratios thereamong. A method for estimating the adaptability will be described later in detail.

Besides the above, the feature quantity extraction unit 103, the adaptability decision unit 107, the adaptability storage unit 151, the timing decision unit 101 and the trigger transmission unit 102 are similar to those of the first embodiment, and accordingly, description thereof will be omitted here.

Next, the timing decision method according to the second embodiment will be described by using FIG. 9.

(A) First, in Step S301, the timing decision apparatus 10 transmits a connection request to the media transmitter 20. Then, in Step S302, the connection is established between the timing decision apparatus 10 and the media transmitter 20.

(B) Next, in Step S303, the media transmitter 30 transmits a connection request to the timing decision apparatus 10. Then, in Step S304, the connection is established between the timing decision apparatus 10 and the media receiver 30. After the connection is established, the media is transmitted from the timing decision apparatus 10 to the media receiver 30, and the media is replayed on the media receiver 30.

Figure 10A:
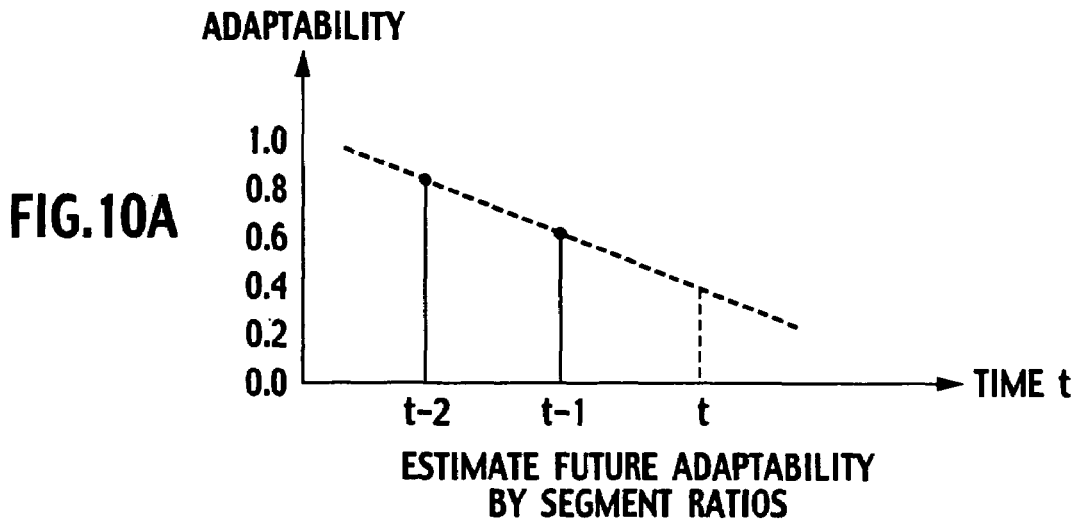
FIGS. 10A, 10B and 10C are views explaining adaptability estimation methods according to the second embodiment.

(C) Next, in Step S305, the feature quantity extraction unit 103 of the timing decision apparatus 10 extracts the feature quantity of the media transmitted to the media receiver 30. Then, in Step S306, the adaptability estimation unit 104 of the timing decision apparatus 10 estimates the future adaptability based on the past adaptability stored in the adaptability storage unit 151. As the adaptability estimation method, as shown in FIG. 10A, there is a method for assuming that the current adaptability exists on the straight line of the adaptability one time before and the adaptability two times before, and assuming the future adaptability by the segment ratios thereamong. From the adaptability F(t−1) at the time t−1 and the adaptability F(t−2) at the time t−2, the adaptability F(t) at the time t can be calculated as:

$$F(t)=2F(t-1)-F(t-2) \qquad \text{Equation (6)}$$

Figure 10B:
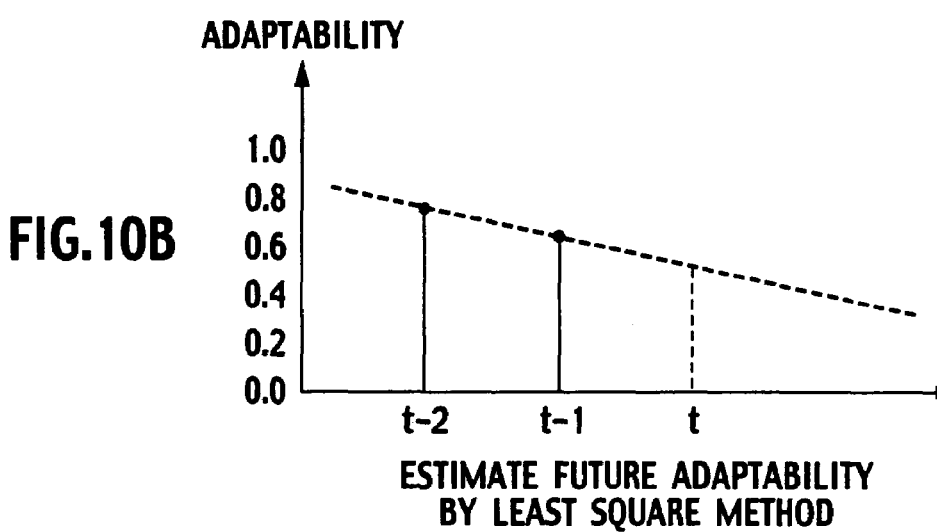
Figure 10C:
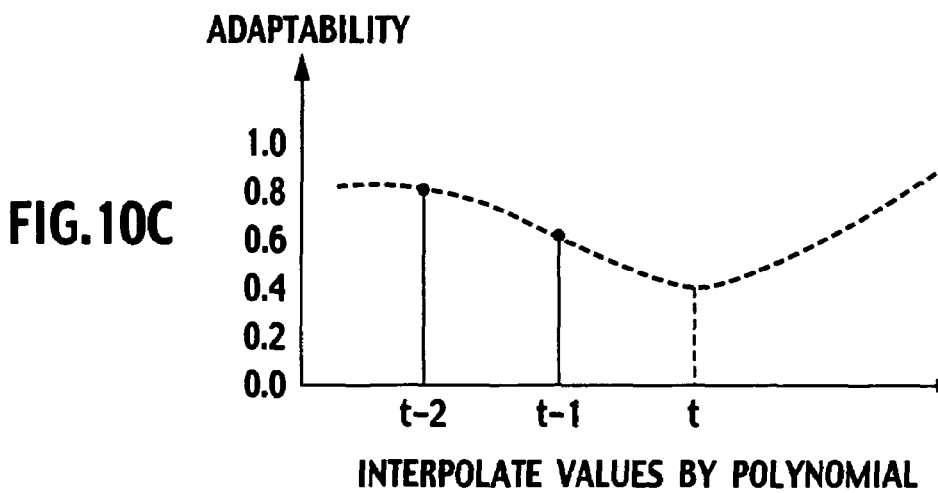

Moreover, as shown in FIG. 10B, there is also a method for estimating the future adaptability by using a least square method and an exponential function (refer to OMURA Taira, "Talk on Experiment and Assessment—Coach for Data Analysis! (original title is in Japanese)", JUSE Press. Ltd., 2003). When it is difficult to accurately express a phenomenon in which the adaptability rises and falls by means of the segment ratios and the least square method, as shown in FIG. 10C, the future adaptability can also be estimated by using a polynomial.

(D) Next, in Step S307, the timing decision unit 101 of the timing decision apparatus 10 acquires the adaptability for providing the service by using the correspondence between the feature quantity and the adaptability estimated by the adaptability estimation unit 104, and decides the timing of moving the service. For example, the timing decision unit 101 determines whether or not the adaptability exceeds a certain value.

(E) When the adaptability meets the condition, the timing decision apparatus 10 transmits a disconnection command to the media receiver 30 through the trigger transmission unit 102 in Step S308. Upon receiving the disconnection command from the timing decision apparatus 10, the media receiver 30 transmits a disconnection request to the timing decision apparatus 10 in Step S309. Thereafter, in Step S310, the connection between the timing decision apparatus 10 and the media receiver 30 is disconnected. Moreover, upon receiving the disconnection command from the timing decision apparatus 10, the media transmitter 20 transmits a disconnection request to the timing decision apparatus 10 in Step S311. Thereafter, in Step S312, the connection between the timing decision apparatus 10 and the media transmitter 20 is disconnected.

(F) Next, upon receiving a connection command from the timing decision apparatus 10, the media transmitter 20 transmits a connection request to the timing decision apparatus 10 in Step S314. Thereafter, in Step S315, the connection between the timing decision apparatus 10 and the media transmitter 20 is established. Moreover, in Step S313, the timing decision apparatus 10 transmits a connection command to the media receiver 31 through the trigger transmission unit 102. Upon receiving the connection command from the timing decision apparatus 10, the media receiver 31 transmits a connection request to the timing decision apparatus 10 in Step S316. Thereafter, in Step S317, the connection between the timing decision apparatus 10 and the media receiver 31 is established. After the connection is established, the media is transmitted from the media transmitter 20 to the media receiver 31, and the media is replayed on the media receiver 31.

According to the timing decision apparatus 10 and the timing decision method in accordance with the second embodiment, the future adaptability can be estimated based on the feature quantity of the media and the past adaptability stored in the adaptability storage unit 151. Therefore, the timing of providing the service can be appropriately decided even for the media for which the adaptability has been unable to be calculated in advance. Specifically, the media being replayed on a communication terminal can be moved to another communication terminal device at appropriate timing.

Third Embodiment

In the first and second embodiments, the timing of moving the media being replayed on a communication terminal (media receiver) to another communication terminal (media receiver) is decided. In a third embodiment, timing of inserting an advertisement into the media being replayed on the communication terminal (media receiver) is decided.

It is conceivable to insert information on a sponsor as information from a contents provider into the midway of a streaming video. In usual, a user desires to continue on watching the streaming information, and does not desire to browse the information on the sponsor. In this case, when the advertisement is inserted into an inappropriate portion in the midway of the streaming video, there is a possibility to spoil a concentration of the user and to give a discomfort to the user (refer to NATAGA Noriko, WAKE H. Sanae, OHSUGA Mieko, INOKUCHI Seiji, "The Effects of the Timing of Commercial Breaks on the Loss of Attention," IEICE Technical Report, HCS2003-10, 2003 (Trans. Inf.& Syst., vol.E87-D, no. 6, pp. 1484-1487, 2004).

As shown in FIG. 11, a timing decision system according to the third embodiment includes the timing decision apparatus 10, the media transmitter 20, and the media receiver 30. Here, it is aimed to perform a service of inserting an advertisement at appropriate timing into the midway of the media (streaming video) being replayed on the media receiver 30 at present. Moreover, for example, a cellular phone, a PHS and the like are used as the media receiver 30; however, the media receiver 30 just has to be an instrument having functions to replay and receive the media, which will be described later in detail.

The media transmitter 20 includes the media storage unit 251, the timing transmission unit 201 for transmitting the media to the timing decision apparatus 10 and the media receiver 30, and an advertisement storage unit 252 for storing the advertisements.

The media transmission unit 201 transmits the media stored in the media storage unit 251 or the advertisement stored in the advertisement storage unit 252 in response to a connection command from the media receiver 30.

The media receiver 30 includes the media receiving unit 301 for receiving the media from the media transmitter 20, the media replay unit 302 for replaying the media, and the trigger receiving unit 303 for receiving the triggers (commands) for the connection/disconnection with the media transmitter 20 from the timing decision apparatus 10. The media receiving unit 311 receives the media or the advertisement in response to the trigger.

As shown in FIG. 11, the timing decision apparatus 10 includes the feature quantity extraction unit 103, the adaptability storage unit 151, the timing decision unit 101, and the trigger transmission unit 102.

The timing decision apparatus 10 is similar to that of the first embodiment except that the trigger transmission unit 102 transmits the trigger (command) at the timing of inserting the advertisement, and accordingly, description thereof will be omitted here.

Moreover, though not shown, the adaptability decision unit 107 described in the first embodiment is provided also in the timing decision apparatus 10 according to the third embodiment according to needs.

Next, a timing decision method according to the third embodiment will be described by using FIG. 12.

(A) First, in Step S401, the media receiver 30 transmits a connection request to the media transmitter 20. Then, in Step S402, the connection is established between the media transmitter 20 and the media receiver 30. After the connection is established, the media is transmitted from the media transmitter 20 to the media receiver 30, and the media is replayed on the media receiver 30.

(B) Next, in Step S403, the feature quantity extraction unit 103 of the timing decision apparatus 10 extracts the feature quantity of the media transmitted from the media transmitter 20 to the media receiver 30. Then, in Step S404, the timing decision unit 101 of the timing decision apparatus 10 acquires the adaptability for providing the service by using the correspondence between the feature quantity and the adaptability, which is stored in the adaptability storage unit 151. For example, the timing decision unit 101 determines whether or not the adaptability exceeds a certain value.

(C) When the adaptability meets the condition, the timing decision apparatus 10 transmits a disconnection command to the media receiver 30 through the trigger transmission unit 102 in Step S405. Upon receiving the disconnection command from the timing decision apparatus 10, the media receiver 30 transmits a disconnection request to the media transmitter 20 in Step S406. Thereafter, in Step S407, the connection between the media transmitter 20 and the media receiver 30 is disconnected.

(D) Next, in Step S408, the timing decision apparatus 10 transmits an advertisement connection command to the media receiver 30 through the trigger transmission unit 102. Upon receiving the connection command from the timing decision apparatus 10, the media receiver 30 transmits an advertisement connection request to the media transmitter 20 in Step S409. Thereafter, in Step S410, the connection between the media transmitter 20 and the media receiver 30 is established. Then, the advertisement is replayed on the media receiver 30.

(E) Next, after an elapse of a fixed time (for example, 30 seconds) after the advertisement is replayed, the timing decision apparatus 10 transmits an advertisement disconnection command to the media receiver 30 in Step S411. Upon receiving the advertisement disconnection command from the timing decision apparatus 10, the media receiver 30 transmits an advertisement disconnection request to the media transmitter 20 in Step S412. Thereafter, in Step S413, the connection between the media transmitter 20 and the media receiver 30 is disconnected. Here, the timing decision apparatus 10 transmits the disconnection command. However, without waiting for the command from the timing decision apparatus 10, the media receiver 30 may disconnect the connection with the media transmitter 20, for example, when the fixed time has elapsed.

As described above, according to the timing decision apparatus 10 and the timing decision method in accordance with the third embodiment, as shown in FIG. 13, the advertisement can be inserted at the timing where the adaptability is high in the case of inserting the advertisement.

Fourth Embodiment

In a fourth embodiment, a system for deciding timing of interlocking an actuator instrument with the replay of the media on the media receiver will be described.

In a ubiquitous society in the future, it is assumed that plural apparatuses provide a service in cooperation with each other. For example, when a video and an audio are replayed on a television set, actuator instruments (for example, a light and an air conditioner) in a room are interlocked therewith in response to the feature quantities of the video and the audio, thus making it possible to obtain a higher sense of realism. Description will be made of an example of using the timing decision apparatus 10 for such a service.

As shown in FIG. 14, the timing decision system according to the fourth embodiment includes the timing decision apparatus 10, the media transmitter 20, the media receiver 30, and an actuator instrument 33. Here, it is aimed to perform a service of operating the actuator instrument at appropriate timing midway of the media (streaming video) being replayed on the media receiver 30 at present.

The media transmitter 20 includes the media storage unit 251 for storing the media, and the media transmission unit 201 for transmitting the media to the timing decision apparatus 10 and the media receiver 30.

The media receiver 30 includes the media receiving unit 301 for receiving the media from the media transmitter 20, and the media replay unit 302 for replaying the media.

As shown in FIG. 14, the timing decision apparatus 10 includes the feature quantity extraction unit 103, the adaptability storage unit 151, the timing decision unit 101, and the trigger transmission unit 102.

To the actuator instrument 33, the trigger transmission unit 102 transmits the triggers (commands) at timing of turning on and off the light and raising and dropping room temperature.

Moreover, the adaptability storage unit 151 stores a correspondence between the feature quantity and an adaptability for operating the actuator instrument 33.

The feature quantity extraction unit 103 and the timing decision unit 101 are similar to those of the first embodiment, and accordingly, description thereof will be omitted here.

Moreover, though not shown here, the adaptability decision unit 107 described in the first embodiment is provided also in the timing decision apparatus 10 according to the fourth embodiment according to needs.

The actuator instrument 33 includes a trigger receiving unit 331 for receiving the triggers (commands) for turning on/off the light and raising/dropping the room temperature from the timing decision apparatus 10, a light control unit 332 for controlling the turn on/off of the light, and a room temperature control unit 333 for controlling the raise/drop of the room temperature.

Next, a timing decision method according to the fourth embodiment will be described by using FIG. 15.

(A) First, in Step S501, the media receiver 30 transmits a connection request to the media transmitter 20. Then, in Step S502, the connection is established between the media transmitter 20 and the media receiver 30. After the connection is established, the media is transmitted from the media transmitter 20 to the media receiver 30, and the media is replayed on the media receiver 30.

(B) Next, in Step S503, the feature quantity extraction unit 103 of the timing decision apparatus 10 extracts the feature quantity of the media transmitted from the media transmitter 20 to the media receiver 30. Then, in Step S504, the timing decision unit 101 of the timing decision apparatus 10 acquires the adaptability for providing the service by using the correspondence between the feature quantity and the adaptability, which is stored in the adaptability storage unit 151, and decides the timing of turning on the light.

(C) When the adaptability meets the condition for turning on the light, the timing decision apparatus 10 transmits a command to turn on the light to the actuator instrument 33 through the trigger transmission unit 102 in Step S505. Upon receiving the command to turn on the light from the timing decision apparatus 10, the actuator instrument 33 turns on the light in Step S506, and in Step S507, transmits a lighting completion signal to the timing decision apparatus 10.

(D) Next, when the adaptability meets the condition for turning off the light, the timing decision apparatus 10 transmits a command to turn off the light to the actuator instrument 33 through the trigger transmission unit 102 in Step S508. Upon receiving the command to turn off the light from the timing decision apparatus 10, the actuator instrument 33 turns off the light in Step S509, and transmits an extinction completion signal to the timing decision apparatus 10 in Step S510.

(E) Next, when the adaptability meets the condition for raising the room temperature, the timing decision apparatus 10 transmits a command to raise the room temperature to the actuator instrument 33 through the trigger transmission unit 102 in Step S511. Next, upon receiving the command to raise the room temperature from the timing decision apparatus 10, the actuator instrument 33 raises the room temperature in Step S513, and transmits a room temperature raise completion signal to the timing decision apparatus 10 in Step S513.

(F) Next, when the adaptability meets the condition for dropping the room temperature, the timing decision apparatus 10 transmits a command to drop the room temperature to the actuator instrument 33 in Step S514. Next, upon receiving the command to drop the room temperature from the timing decision apparatus 10, the actuator instrument 33 drops the room temperature in Step S515, and transmits a room temperature drop completion signal to the timing decision apparatus 10 in Step S516.

Moreover, it is determined whether or not the above-described adaptability meets the respective conditions by referring, for example, to a table of adaptive patterns, which is shown in FIG. 16. In FIG. 16, the feature quantities are associated with temperatures to be controlled to. Pattern 1 shows that the temperature is to be controlled to be rather higher (27° C. here) when, as metadata (high-level feature quantity), a climax is going on according to the media. Pattern 2 shows that, when the motion vector of the video is the threshold value or less, the motion is determined to be a little, and the temperature is controlled to be rather lower (25° C. here). Pattern 3 shows that, when the motion vector of the video is the threshold value or more (or when there is no sound), the motion is determined to be much, and the temperature is controlled to be rather higher (26° C. here). Such a table of the adaptive patterns is stored in the adaptability storage unit 151, and based on the patterns, the actuator instrument 33 is controlled.

According to the timing decision apparatus 10 and the timing decision method according to the fourth embodiment, for example, when the video reaches the climax scene, the light can be furiously changed, and when the video replays a gentle scene, the light can be gently changed. Moreover, for example, when a terrible scene is replayed, the room temperature can be dropped, and when a gentle scene is replayed, the room temperature can be raised.

As described above, the actuator instrument 33 can be interlocked with the video, thus making it possible to further enhance the sense of realism.

Fifth Embodiment

In the fourth embodiment, the actuator instrument is provided separately from the media receiver, and is operated in response to the adaptability. In a fifth embodiment, description will be made of the case of providing such an actuator function in the media receiver.

Nowadays, plural actuator instruments are mounted on a portable terminal such as a notebook PC, a PDA and a cellular phone. For example, the actuator instruments include a display, a speaker, a vibrator, and the like. By interlocking these actuator instruments with one another, the sense of realism in the communication service can be further enhanced. For example, the communication service includes a distribution of streaming video, an audio phone, a TV phone, and the like. Description will be made of an example of using the timing decision apparatus 10 for the service as described above.

As shown in FIG. 17, a timing decision system according to the fifth embodiment includes the timing decision apparatus 10, the media transmitter 20, and a media receiver 34. Here, it is aimed to perform a service of operating an actuator function in the media receiver 34 at appropriate timing midway of the media (streaming video) being replayed on the media receiver 30 at present.

The media transmitter 20 includes the media storage unit 251 for storing the media, and the media transmission unit 201 for transmitting the media to the timing decision apparatus 10 and the media receiver 34.

The media receiver 34 includes the media receiving unit for receiving the media from the media transmitter 20, the media replay unit 302 for replaying the media, the trigger receiving unit 331 for receiving a trigger (command) accompanied with a vibration, and the vibration control unit 332 for vibrating the media receiver 34.

As shown in FIG. 17, the timing decision apparatus 10 includes the feature quantity extraction unit 103, the adaptability storage unit 151, the timing decision unit 101, and the trigger transmission unit 102.

The trigger transmission unit 102 transmits the trigger (command) at the timing of starting/stopping the vibration to the media receiver 34.

Moreover, the adaptability storage unit 151 stores the correspondence between the feature quantity and the adaptability for operating the media receiver 34.

The feature quantity extraction unit 103 and the timing decision unit 101 are similar to those of the first embodiment, and accordingly, description thereof will be omitted here.

Moreover, though not shown here, the adaptability decision unit 107 described in the first embodiment is provided also in the timing decision apparatus 10 according to the fifth embodiment according to needs.

Next, a timing decision method according to the fifth embodiment will be described by using FIG. 18.

(A) First, in Step S601, the media receiver 34 transmits a connection request to the media transmitter 20. Then, the connection is established between the media transmitter 20 and the media receiver 34 in Step S602. After the connection is established, the media is transmitted from the media transmitter 20 to the media receiver 34, and the media is replayed on the media receiver 34.

(B) Next, in Step S603, the feature quantity extraction unit 103 of the timing decision apparatus 10 extracts the feature quantity of the media transmitted from the media transmitter 20 to the media receiver 34. Then, in Step S604, the timing decision unit 101 of the timing decision apparatus 10 acquires the adaptability for providing the service by using the correspondence between the feature quantity and the adaptability, which is stored in the adaptability storage unit 151, and decides the timing of the vibration.

(C) When the adaptability meets the condition for starting the vibration, the timing decision apparatus 10 transmits a command to start the vibration to the media receiver 34 through the trigger transmission unit 102 in Step S605. Upon receiving the command to start the vibration, the media receiver 34 starts the vibration in Step S606, and transmits a vibration start completion signal to the timing decision apparatus 10 in Step S607.

(D) Next, when the adaptability meets the condition for stopping the vibration, the timing decision apparatus 10 transmits a command to stop the vibration to the media receiver 34 through the trigger transmission unit 102 in Step S608. Upon receiving the command to stop the vibration from the timing decision apparatus 10, the media server 34 stops the vibration in Step S609, and transmits a vibration stop completion signal to the timing decision apparatus 10 in Step S610.

Moreover, it is determined whether or not the above-described adaptability meets the condition for starting or stopping the vibration by referring, for example, to a table of adaptive patterns, which is shown in FIG. 19. In FIG. 19, the feature quantities are associated with vibrations to be controlled. Pattern 1 shows that a vibrator is not activated when a volume as the audio feature quantity is a threshold value or less. Pattern 2 shows that the vibrator is activated when a motion vector as the video feature quantity is the threshold value or more (example: scene where the motion is violent), or when the volume as the audio feature quantity is the threshold value or more (example: scene in full gear). Pattern 3 shows that the vibrator is activated when the sound contains a frequency as the audio feature quantity, which is a threshold value or more. Such a table of the adaptive patterns is stored in the adaptability storage unit 151, and based on the patterns, the media receiver 34 is controlled.

According to the timing decision apparatus 10 and the timing decision method according to the fifth embodiment, for example, when the motion in the scene exhibits a predetermined motion or more, the vibrator can be activated. Moreover, the vibrator can be activated in response to the volume.

As described above, the media receiver 34 is interlocked with the video, thus making it possible to further enhance the sense of realism.

Other Embodiments

Although the present invention has been described by the embodiments described above, it should not be understood that the descriptions and the drawings, which form a part of this disclosure, limit the invention. From this disclosure, various alternative embodiments, examples and operation technologies will be apparent to those skilled in the art.

For example, though it has been described that the connection request and the disconnection request are transmitted from the media receivers 30, 31 and 34 to the media transmitter 20 in the first to fifth embodiments, the connection request and the disconnection request may be transmitted from the transmitter 20 to the media receivers 30, 31 and 34.

Moreover, though it has been described that the timing decision apparatus 10 transmits the connection command after transmitting the disconnection command with reference to FIG. 2 (Steps S105 and S108), the timing decision apparatus 10 may transmit the disconnection command after transmitting the connection command. The same can also be applied to the embodiment described with reference to FIG. 9.

Moreover, though it has been described that one CPU may include the adaptability decision unit 107, the feature quantity extraction unit 103 and the timing decision unit 101 as one module, the respective units may be individually provided in different CPUs, and may be defined as different devices. In this case, it is assumed to connect the plural devices to one another by using buses and the like.

As described above, it is a matter of course that the present invention incorporates the various embodiments and the like, which are not described here. Hence, the technical scope of the present invention is defined only by items specifying the invention, which are according to the scope of claims reasonable based on the above description.

What is claimed is:

1. A timing decision apparatus, comprising:
    an adaptability decision unit configured to determine a correspondence between a feature quantity of encoded data and an adaptability value defining a degree of adaptation for providing a predetermined service;
    an adaptability storage unit configured to store the correspondence;
    a timing decision unit configured to determine a time when the adaptability value stored in the adaptability storage unit exceeds a threshold value, as a timing of providing the predetermined service; and
    a trigger transmission unit configured to transmit a trigger to disconnect with a media transmitter to a first media receiver, and transmit a trigger to connect with the media transmitter to a second media receiver, wherein
    the predetermined service is a service movement that moves encoded data, which is being transmitted from the media transmitter and being replayed on the first media receiver, to the second media receiver.

2. The timing decision apparatus according to claim 1, further comprising:
    an adaptability estimation unit configured to estimate a future adaptability value based on a past adaptability value stored in the adaptability storage unit and the feature quantity of the encoded data.

3. The timing decision apparatus according to claim 1, wherein the adaptability decision unit includes
    a feature quantity extraction unit configured to extract the feature quantity of the encoded data at a designated time,
    a media replay unit configured to replay the encoded data,
    an adaptability acquisition unit configured to acquire an assessment result for the designated time as the adaptability value, and
    a correspondence creation unit configured to associate the feature quantity at the designated time and the assessment result for the designated time with each other.

4. The timing decision apparatus according to claim 1, wherein the feature quantity is classified into a low-level feature quantity calculated from a measurement value of the encoded data and a high-level feature quantity capturing a semantic aspect of the encoded data.

5. The timing decision apparatus according to claim 4, wherein when the encoded data is video data, the low-level feature quantity includes at least one of a color, a texture, a shape, a motion, and a region, of an overall frame or a subject.

6. The timing decision apparatus according to claim 4, wherein when the encoded data is music data, the low-level feature quantity includes at least one of a size, a pitch, and a spectrum analysis signal of a sound.

7. A timing decision method of a timing decision apparatus, comprising:

determining, with an adaptability decision unit of the timing decision apparatus, a correspondence between a feature quantity of encoded data and an adaptability value defining a degree of adaptation for providing a predetermined service;

storing the correspondence in a memory of the timing decision apparatus;

determining, with a timing decision unit of the timing decision apparatus, a time when the adaptability value stored in the adaptability storage unit exceeds a threshold value, as a timing the predetermined service; and transmitting, with a trigger transmission unit of the timing decision apparatus, a trigger to disconnect with a media transmitter to a first media receiver, and transmitting a trigger to connect with the media transmitter to a second media receiver, wherein the predetermined service is a service movement that moves encoded data, which is being transmitted from the media transmitter and being replayed on the first media receiver, to the second media receiver.

8. The timing decision method of a timing decision apparatus according to claim 7, further comprising:

estimating, with an adaptability estimation unit of the timing decision apparatus, a future adaptability value based on a past adaptability value stored in the past and the feature quantity of the encoded data.

9. The timing decision method of a timing decision apparatus according to claim 7, wherein the step of determining the correspondence includes extracting the feature quantity of the encoded data at a designated time, replaying the encoded data, acquiring an assessment result for the designated time as the adaptability value, and associating the feature quantity at the designated time and the assessment result for the designated time with each other.

10. A timing decision apparatus, comprising:

an adaptability decision unit configured to determine a correspondence between a feature quantity of encoded data and an adaptability value defining a degree of adaptation for providing a predetermined service;

an adaptability storage unit configured to store the correspondence;

a timing decision unit configured to determine a time when the adaptability value stored in the adaptability storage unit exceeds a threshold value, as a timing of providing the predetermined service; and a trigger transmission unit configured to transmit a predetermined trigger at the timing determined by the timing decision unit, wherein the predetermined service is an advertisement insertion service that inserts an advertisement into the encoded data being transmitted from a media transmitter and replayed on a media receiver, and the trigger transmission unit transmits a first trigger and a second trigger to the media receiver, the first trigger is a trigger to request the media transmitter to stop transmitting the encoded data, and the second transmitter is a trigger to request the media transmitter to transmit advertisement data to the media receiver.

11. A timing decision apparatus, comprising:

an adaptability decision unit configured to determine a correspondence between a feature quantity of encoded data and an adaptability value defining a degree of adaptation for providing a predetermined service;

an adaptability storage unit configured to store the correspondence;

a timing decision unit configured to determine a time when the adaptability value stored in the adaptability storage unit exceeds a threshold value, as a timing of providing the predetermined service; and a trigger transmission unit configured to transmit a trigger to disconnect with a media transmitter to a first media receiver, and transmit a trigger to connect with the media transmitter to a second media receiver, wherein the trigger transmission unit is further configured to transmit at least one trigger for at least one of turning on and off a light and raising and dropping a room temperature to an actuator instrument, and the predetermined service includes an actuator interlocking service that interlocks the actuator instrument with a replay of the encoded data on a media receiver receiving the encoded data from the media transmitter.

12. A timing decision method of a timing decision apparatus, comprising:

determining, with an adaptability decision unit of the timing decision apparatus, a correspondence between a feature quantity of encoded data and an adaptability value defining a degree of adaptation for providing a predetermined service;

storing the correspondence in a memory of the timing decision apparatus;

determining, with a timing decision unit of the timing decision apparatus, a time when the adaptability value stored in the adaptability storage unit exceeds a threshold value, as a timing the predetermined service; and transmitting, with a trigger transmission unit of the timing decision apparatus, a trigger to disconnect with a media transmitter to a first media receiver, and transmitting a trigger to connect with the media transmitter to a second media receiver, the transmitting, with the trigger transmission unit, further includes transmitting a predetermined trigger at the time determined by the timing decision unit, wherein the predetermined service includes an advertisement insertion service that inserts an advertisement into the encoded data being transmitted from a media transmitter and replayed on a media receiver, and the transmitting, with the trigger transmission unit, further includes transmitting a first trigger and a second trigger to the media receiver, the first trigger is a trigger to request the media transmitter to stop transmitting the encoded data, and the second transmitter is a trigger to request the media transmitter to transmit an advertisement data to the media receiver.

13. A timing decision method of a timing decision apparatus, comprising:

determining, with an adaptability decision unit of the timing decision apparatus, a correspondence between a feature quantity of encoded data and an adaptability value defining a degree of adaptation for providing a predetermined service;

storing the correspondence in a memory of the timing decision apparatus;

determining, with a timing decision unit of the timing decision apparatus, a time when the adaptability value stored in the adaptability storage unit exceeds a threshold value, as a timing the predetermined service; and transmitting, with a trigger transmission unit of the timing decision apparatus, a trigger to disconnect with a media transmitter to a first media receiver, and transmitting a trigger to connect with the media transmitter to a second media receiver, wherein the transmitting includes transmitting at least one trigger for at least one of turning on and off a light and raising and dropping a room temperature to the actuator instrument, and the predetermined service includes an actuator interlocking service that interlocks an actuator instrument with a replay of the encoded data on a media receiver receiving the encoded data from a media transmitter.

* * * * *